United States Patent [19]

Tabuchi

[11] Patent Number: 4,668,900
[45] Date of Patent: May 26, 1987

[54] DIGITAL SERVO APPARATUS

[75] Inventor: Junichiro Tabuchi, Daito, Japan

[73] Assignee: Sanyo Electric Co., Ltd., Moriguchi, Japan

[21] Appl. No.: 786,940

[22] Filed: Oct. 11, 1985

[30] Foreign Application Priority Data

Oct. 12, 1984 [JP] Japan .................................. 59-214954
Sep. 4, 1985 [JP] Japan .................................. 60-195058

[51] Int. Cl.$^4$ .............................................. G05B 1/02
[52] U.S. Cl. ................................. 318/608; 318/603; 318/327; 318/85; 318/7
[58] Field of Search ............... 318/327, 326, 314, 603, 318/636, 601, 608, 85, 329, 310, 311, 66, 7, 72, 51, 59; 360/73, 69, 70, 10.2

[56] References Cited

U.S. PATENT DOCUMENTS

| | | | |
|---|---|---|---|
| 4,270,077 | 5/1981 | Swartz | 318/636 X |
| 4,371,921 | 2/1983 | Cushman | 318/636 X |
| 4,498,034 | 2/1985 | Shirakawa | 318/327 X |
| 4,500,822 | 2/1985 | Tajima | 318/326 X |
| 4,514,671 | 4/1985 | Louth | 318/327 X |
| 4,536,806 | 8/1985 | Louth | 360/69 |
| 4,584,507 | 4/1986 | Taylor | 318/327 |

Primary Examiner—Charles D. Miller
Assistant Examiner—Patrick C. Keane
Attorney, Agent, or Firm—Armstrong, Nikaido, Marmelstein & Kubovcik

[57] ABSTRACT

A digital servo apparatus according to the present invention latches a count output of a counter (11) for counting reference clock signals in response to output of a speed detecting pulse from a speed detecting pulse generator (10a) in a latch circuit (141), thereby to latch the count output latched in the latch circuit (141) in another latch circuit (142) upon output of a subsequent speed detecting pulse. The digital servo apparatus further latches the count output of the counter (11) in a latch circuit (16) in response to output of a phase detecting pulse from a phase detecting pulse generator (10b). A comparator (15) compares difference between the count outputs latched in the latch circuits (141) and (142), so that the compared output difference and the count output latched in the latch circuit (16) are converted into analog signals to be sampled and held respectively thereby to produce a speed error signal and a phase error signal, which are added up to be supplied to a driving circuit (22). On the basis of the speed error signal and the phase error signal, the driving circuit (22) controls the speed and phase of a motor (10). Thus, only one counter (11) may be provided for producing the speed error signal and the phase error signal.

19 Claims, 35 Drawing Figures

FG

V

PG

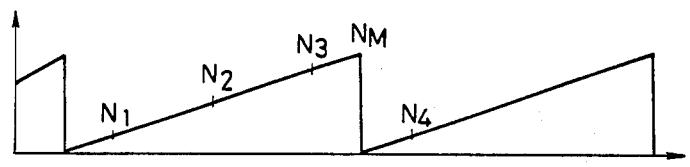
FIG.5(A)
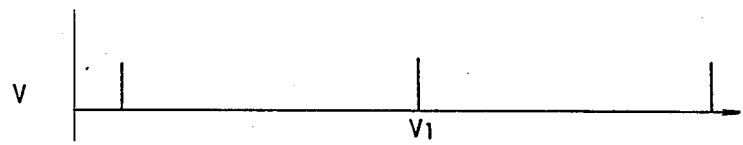
FIG.5(B)
FIG.5(C)
FIG.5(D)
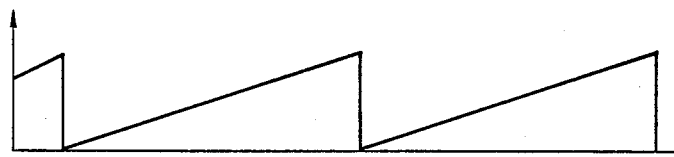
FIG.9(A)
FIG.9(B)
FIG.9(C)
FIG.9(D)
FIG.9(E)
FIG.9(F)

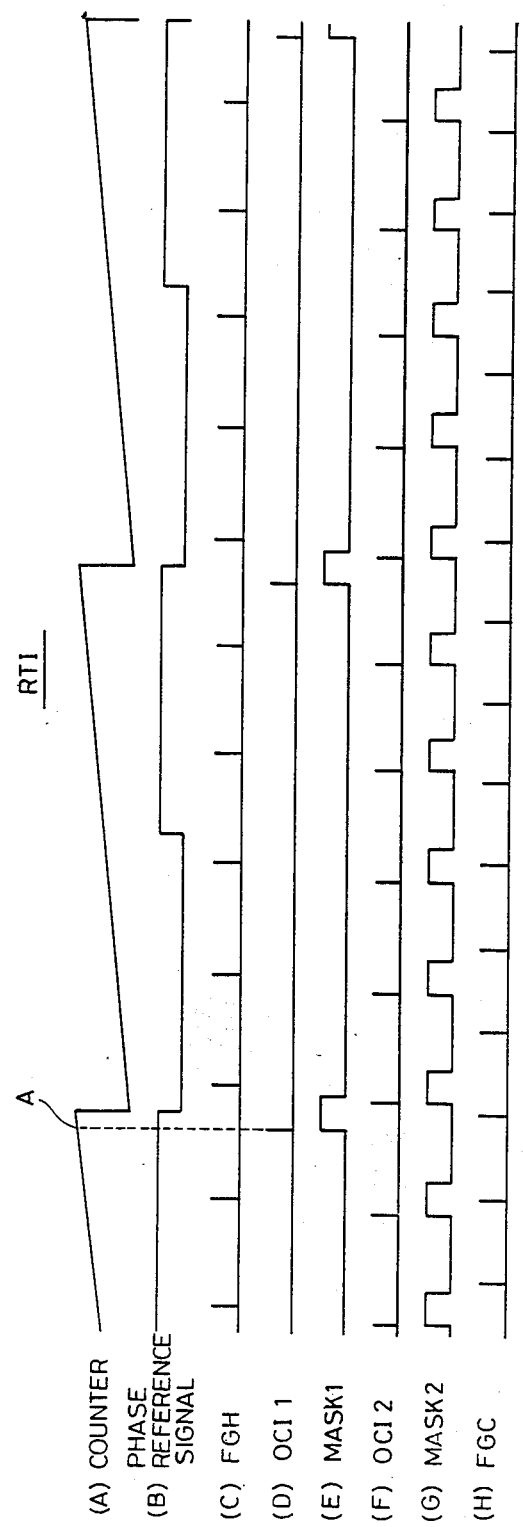

DIGITAL SERVO APPARATUS

BACKGROUND OF THE INVENTION

1. Field of the Invention

The present invention relates to a digital servo apparatus. More specifically, it relates to a digital servo apparatus which controls the phases and speeds of motors for, e.g., video tape recorders.

2. Description of the Prior Art

Digital servo apparatuses have been utilized for controlling rotation of motors provided in, e.g., video tape recorders. As shown in Matsushita Technical Report, Vol. 28, No. 3, June 1982, FIGS. 25 and 26 (pages 191 and 192), a conventional digital servo apparatus comprises three counters respectively serving as a speed controller, a phase controller and a frequency divider for generating phase reference signals, with respect to one motor.

FIG. 1 is a schematic block diagram showing a conventional digital servo apparatus. Referring to FIG. 1, description is now made on the conventional digital servo apparatus. With respect to a motor 1, provided are a speed detecting pulse generator 1a and a phase detecting pulse generator 1b. First and second counters 2a and 2b respectively count clock pulses generated from a clock pulse generator 3, the first counter 2a being reset by an FG pulse generated by the speed detecting pulse generator 1a and second counter 2b being reset by a PG pulse generated by the phase detecting pulse generator 1b. Count outputs from the first counter 2a are converted into analog signals by a first D-A converter 3a, to be sampled and held by a first sample-and-hold circuit 4a and supplied to an adder 5.

On the other hand, count outputs from the second counter 2b are converted into analog signals by a second D-A converter 3b, to be sampled and held by a second sample-and-hold circuit 4b and supplied to the adder 5. The adder 5 adds the signals respectively sampled and held by the first and second sample-and-hold circuits 4a and 4b and applies the added signal to a driving circuit as error signals. The driving circuit 7 controls the speed and phase of the motor 1 on the basis of the supplied error signals.

FIGS. 2 and 3 are timing charts for illustrating the operation of the digital servo apparatus as shown in FIG. 1 for controlling the speed and phase of the motor.

The operation of the conventional digital servo apparatus is now described with reference to FIGS. 1 to 3. The first counter 2a counts the reference clock signals generated by the reference clock signal generator 3, the count output of which is gradually increased as shown in FIG. 2(A). The count output from the first counter 2a is supplied to the first D-A converter 3a in synchronization with an FG pulse generated from the speed detecting pulse generator 1a. The first counter 2a is reset by the FG pulse. The analog signal converted by the first D-A converter 3a is sampled and held by the first sample-and-hold circuit 4a to the rise of a subsequent FG pulse, and supplied to the adder 5 as a speed error signal.

As shown in FIG. 3(B), the second counter 2b starts counting the reference clock signals from the reference clock signal generator 3 in synchronization with a V pulse generated from the phase reference signal generator 6. The count output from the second counter 2b is gradually increased as shown in FIG. 3(A). The said count output from the second counter 2b is supplied to the second D-A converter 3b in synchronization with a PG pulse generated from the phase detecting pulse generator 1b, as shown in FIG. 3(C). Thereafter the second counter 2b is reset. The analog signal outputted from the second D-A converter 3b is sampled and held to the rise of a subsequent PG pulse, and supplied to the adder 5 as a phase error signal. The outputs from the adder 5 are supplied to the driving circuit 7, to control the speed and phase of the motor 1.

In case of forming the digital servo apparatus in the aforementioned structure by a one-chip microcomputer, however, such a microcomputer generally contains only one or two counters in one chip, and hence the apparatus formed by the same can merely control the speed and phase of only one motor by one chip at the most.

On the contrary, a video tape recorder generally contains a plurality of motors such as a capstan motor in addition to a cylinder motor, and the number of microcomputers must be increased in order to control the motors.

SUMMARY OF THE INVENTION

Accordingly, the principal object of the present invention is to provide a digital servo apparatus which can control the speed and phase of a motor as well as those of a plurality of motors by only one counter.

Briefly stated, a digital servo apparatus according to the present invention counts reference clock signals from a reference clock signal generator means by a counter means while resetting the counter means by a phase reference signal from a phase reference signal generator means, to read the count output of the counter means in response to supply of a speed signal from a speed signal generator means provided in relation to a rotating member. The count output is compared with a count output read upon supply of a speed signal immediately ahead of the said speed signal by a read/compare means, thereby to generate a speed error signal for the rotating member on the basis of the compared output. In response to supply of a phase signal from a phase signal generator means provided in relation to the rotating member, the count output of the counter means is read to generate a phase error signal, thereby to control the speed and phase of the rotating member on the basis of the speed error signal and the phase error signal.

Thus, according to the present invention, the speed error signal and the phase error signal can be generated by only one counter means, whereby a digital servo apparatus is implemented in simple structure.

In a preferred embodiment of the present invention, the count output of a counter means is stored in a first storage means in response to supply of a speed signal so that the count output stored in the first storage means is stored in a second storage means in response to supply of a subsequent speed signal, to compare the count outputs respectively stored in the first and second storage means thereby to extract the compared output. A speed error signal generator means is formed by a first D-A converter means for converting the compared output from a read/compare means into an analog signal and a first sample-and-hold means for sampling and holding the converted analog signal. Further, a phase error signal generator means is formed by a second D-A converter means for converting the read counter output into an analog signal and a second sample-and-hold means for sampling and holding the converted analog signal.

In the preferred embodiment of the present invention, further, one D-A converter means is provided as the speed error signal generator means and phase error signal generator means so that a multiplexer selects the output of the read/compare means and the output of a read means to supply the same to the D-A converter means, the output of which is separated by a demultiplexer into a speed error signal and a phase error signal, which are sampled and held respectively.

Thus, according to the preferred embodiment of the present invention, provided are only the multiplexer, one D-A converter means and the demultiplexer in order to generate the speed error signal and the phase error signal.

In a more preferred embodiment of the present invention, a counter means, a read/compare means and a read means are formed by a microcomputer. Thus, according to this preferred embodiment of the present invention, a digital servo apparatus can be implemented in simple structure by a one-chip microcomputer containing only one counter.

In a further preferred embodiment of the present invention, a plurality of rotating members are provided so that speed signal generator means, phase signal generator means, read/compare means, read means, speed error signal generator means, phase error signal generator means and driving means are provided in correspondence to the plurality of rotating members respectively, with provision of one phase reference signal generator means, one reference clock signal generator means and one counter means for controlling the speeds and phases of the said plurality of rotating members.

In another aspect of the present invention, a digital servo apparatus is provided for controlling the speeds and phases of at least two rotating members. At the output timing of a rotation detecting signal for one of the rotating members, a first error signal is produced on the basis of the count output of a counter means for counting reference clock signals while the count output of the counter means at the output timing of a rotation detecting signal for the other rotating member is stored, so as to produce a second error signal in response to output of the rotation detecting signal for the other rotating member on the basis of the stored count output, so that the first error signal is produced in priority to the second error signal to make the operation for producing the second error signal wait.

Even if rotation detecting signals for two rotating members are simultaneously outputted, the phase and speed of one of the rotating members can be controlled in priority thereby to prevent erroneous control of the rotating members.

In a preferred embodiment of the present invention, an input capture register is employed as the storage means.

In the preferred embodiment of the present invention, further, a first rotation signal detecting means is formed by a first speed signal generator means generating a signal representing the speed of one of the rotating members and a first phase signal generator means generating a signal representing the phase thereof, while a first error signal producing means is formed by a first speed error signal generator means and a first phase error signal generator means. In response to supply of the first speed signal, the first speed error signal generator means generates a speed error signal for one of the rotating members on the basis of the count output of a counter means and a count output thereof upon supply of a first speed signal immediately ahead of the said first speed signal. The first phase error signal generator means generates a phase error signal when the first speed signal is in prescribed relation to the first phase signal.

In a more preferred embodiment of the present invention, a second rotation signal detecting means is formed by a second speed signal generator means generating a signal representing the speed of the other rotating member and a second phase signal generator means frequency-dividing the second speed signal and generating a signal representing the phase. A second error signal producing means is formed by a second speed error signal generator means and a second phase error signal generator means. In response to output of the second speed signal, the second speed error signal generator means generates a speed error signal for the other rotating member on the basis of the count output of the counter means and a count output thereof upon output of a second speed signal immediately ahead of the said second speed signal stored in the storage means. In response to output of the second phase signal, the second phase error signal generator means generates a phase error signal for the other rotating member on the basis of the count output of the counter means stored in the storage means.

In a further embodiment of the present invention, generation of the speed error signal for the other rotating member by the second speed error signal generator means is inhibited during generation of the speed error signal for the one of the rotating members by the first speed error signal generator means, while generation of the phase error signal for the other rotating member by the second phase error signal generator means is inhibited.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 (A-D) timing chart for illustrating operation of the digital servo apparatus as shown in FIG. 4;

FIG. 9 (A-F) is a timing chart for illustrating operation of the digital servo apparatus as shown in FIG. 8;

FIG. 17 (A–H) is a timing chart for illustrating operation of the embodiment as shown in FIG. 10.

DESCRIPTION OF THE PREFERRED EMBODIMENTS

Figure 1:
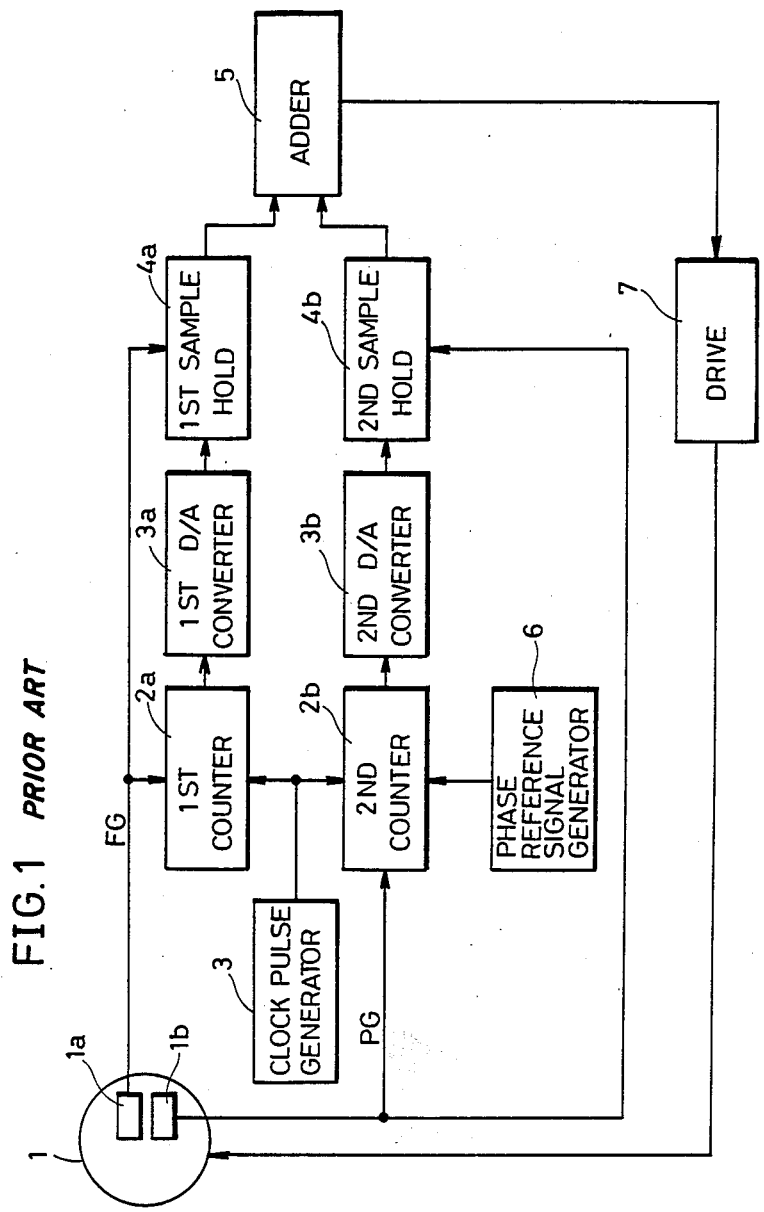
FIG. 1 is a schematic block diagram of a conventional digital servo apparatus.
Figure 2A:
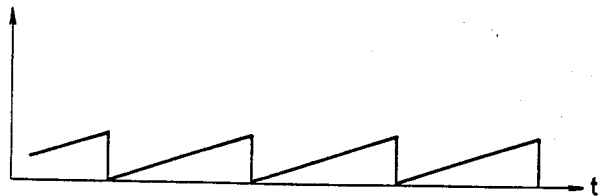
FIGS. 2(A), (B) and 3(A)–(C) are timing charts for illustrating speed and phase controlling operation of the digital servo apparatus as shown in FIG. 1.
Figure 2B:
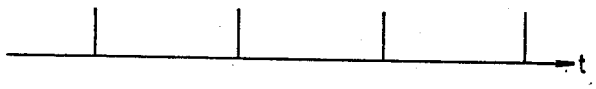
Figure 3A:
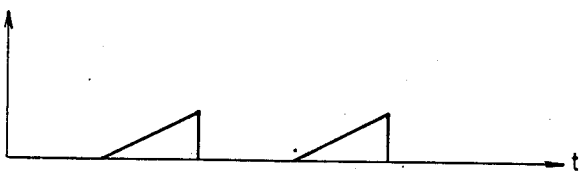
Figure 3B:
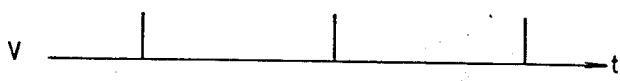
Figure 3C:
Figure 4:
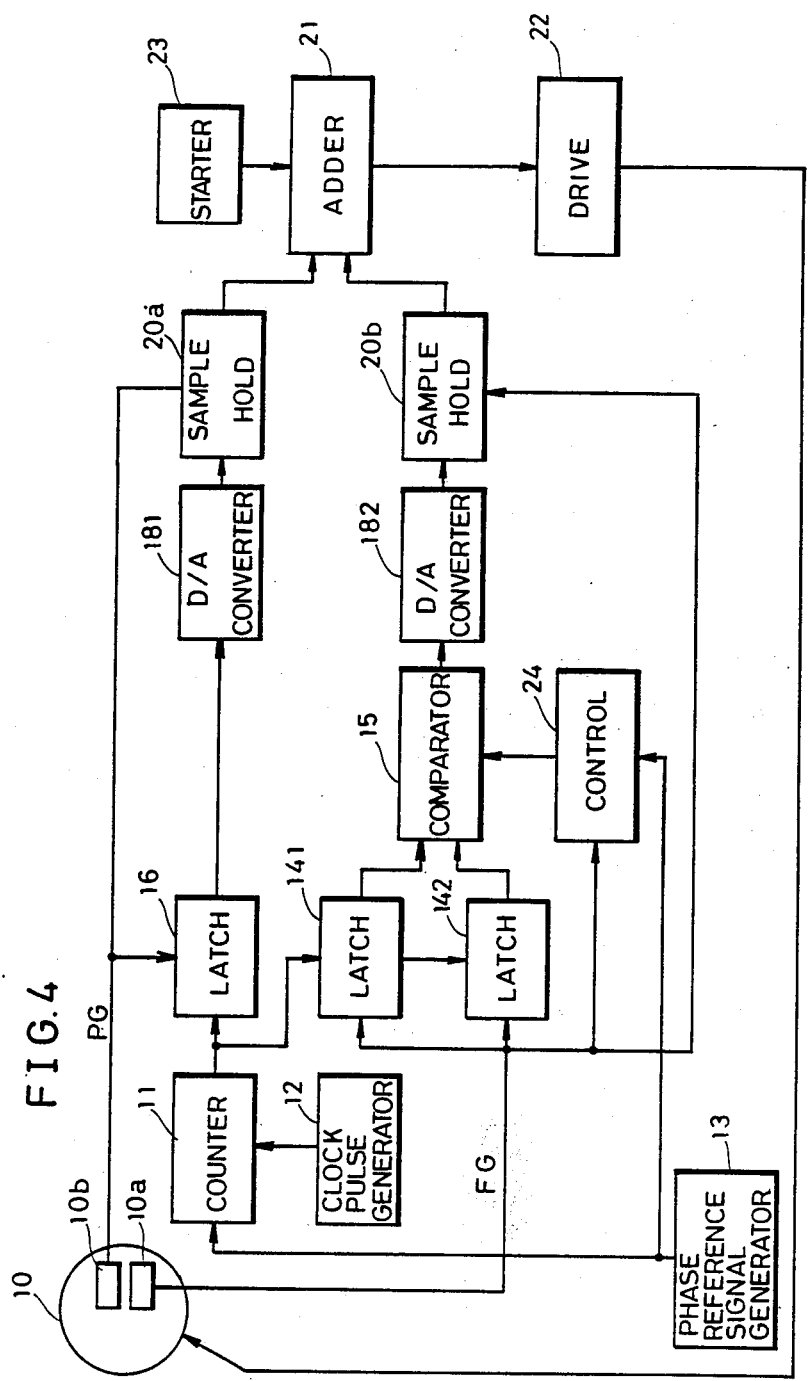
FIG. 4 is a schematic block diagram showing an embodiment the present invention.

FIG. 4 is a schematic block diagram showing an embodiment of the present invention. Referring to FIG. 4, description is now made on the structure of this embodiment. In relation to a motor 10, provided are a speed detecting pulse generator 10a and a phase detecting pulse generator 10b similarly to the prior art example as hereinabove described with reference to FIG. 1. A counter 11 counts reference clock signals generated from a reference clock pulse generator 12, and is reset in synchronization with a V pulse generated from a phase reference signal generator 13 as a phase reference signal. A latch circuit 141 is adapted to latch the count output of the counter 11 in response to supply of an FG pulse from the speed detecting pulse generator 10a. Another latch circuit 142 latches the count output latched by the latch circuit 141 in response to supply of a subsequent FG pulse.

The count outputs respectively latched by the latch circuits 141 and 142 are supplied to a comparator 15. The comparator 15 operates difference between the two count outputs thereby to generate a speed error signal.

On the other hand, a latch circuit 16 latches the count output of the counter 11 in synchronization with a PG pulse generated from the phase detecting pulse generator 10b, to output the same as a phase error signal. The phase error signal is supplied to a D-A converter 181 to be converted into an analog signal, which is sampled and held by a sample-and-hold circuit 20a. In a similar manner, the speed error signal generated from the comparator 15 is converted by a D-A converter 182 into an analog signal, which is supplied to a sample-and-hold circuit 20b. The speed error signal and the phase error signal respectively sampled and held by the sample-and-hold circuits 20a and 20b are supplied to an adder 21.

There is provided a starter 23 associated with the adder 21, which starter 23 supplies a start signal to a driving circuit 22 through the adder 21 for starting the motor 10. The driving circuit 22 drives the motor 10 on the basis of the start signal while controlling the phase and speed of the motor 10 on the basis of the phase and speed error signals added up by the adder 21.

It is preferred, from a controlling manner described subsequently, that the speed detecting pulse generator 10a and the phase detecting pulse generator 10b are set in advance so that the FG pulse generated from the speed detecting pulse generator 10a is not overlapped in time with the PG pulse generated from the phase detecting pulse generator 10b in the vicinity of set speed and phase of the motor 10. Meanwhile the speed error signal and the phase error signal are generated on the basis of the count outputs of the same counter 11, whereby the output of the comparator 15 is equal in maximum digital value to that of the latch circuit 16.

FIG. 5 is a timing chart for illustrating operation of the digital servo apparatus as shown in FIG. 4.

With reference to FIGS. 4 and 5, description is now definitely made on the operation of the embodiment.

The counter 11 counts the reference clock signals generated from the reference clock signal generator 12, and is reset in synchronization with the V pulse (see FIG. 5(B)) generated from the phase reference signal generator 13. The latch circuit 141 reads the count value of the counter 11 in synchronization with the FG pulse from the speed detecting pulse generator 10a as shown in FIG. 5(C), while the latch circuit 142 latches the count value latched by the latch circuit 141 in synchronization with a subsequent FG pulse.

The comparator 15 calculates difference between the count values respectively latched by the latch circuits 141 and 142, to generate the speed error signal. In other words, the comparator 15 calculates the difference $N_2 - N_1$, assuming that $N_1$ and $N_2$ represent the count values of the counter 11 at respective rise timings of a series of FG pulses $FG_1$ and $FG_2$, as shown in FIG. 5. However, when a V pulse $V_1$ is generated from the phase reference signal generator 13 between a series of FG pulses $FG_3$ and $FG_4$ at count values $N_3$ and $N_4$, the counter 11 is reset and the speed cannot be controlled if the comparator 15 operates in a similar manner to that described above.

In this embodiment, therefore, a controller 24 for receiving the FG pulse and the V pulse is employed to control the comparator 15 so that the comparator 15 calculates the difference $N_4 + N_M - N_3$ at the rise timing of the subsequent FG pulse after generation of the V pulse, where $N_m$ represents the maximum value of the counter 11.

It is to be noted that, when the V pulse $V_1$ is generated between the FG pulses FG and FG4, the FG pulse $FG_4$ subsequent to the generation of the V pulse $V_1$ may be cancelled so that the forward speed error signal is held by the sample-and-hold circuit 20a. In other words, the speed error signal between the FG pulses $FG_2$ and $FG_3$ is employed as the speed error signal during generation of the FG pulses $FG_3$ and $FG_4$. Since such a period is extremely short, the said control exerts no significant influence on the speed control operation.

As hereinabove described, the difference between the count values calculated by the comparator 15 is supplied to the D-A converter 182 as the speed error signal, which is converted into the analog signal to be sampled and held by the sample-and-hold circuit 20b.

On the other hand, the latch circuit 16 latches the count value of the counter 11 in synchronization with the PG pulse generated from the phase detecting pulse generator 10b. The output from the latch circuit 16 is supplied to the D-A converter 181 as the phase error signal, which is converted into an analog signal to be sampled and held by the sample-and-hold circuit 20a. The adder 21 adds up the phase error signal and the speed error signal respectively sampled and held by the sample-and-hold circuits 20a and 20b, to supply an error signal to the driving circuit 22. The driving circuit 22 controls the phase and speed of the motor 10 on the basis of the error signal.

The FG pulses and PG pulses as shown in FIG. 5 represent the outputs obtained when the motor 10 is in set speed and phase, while the abscissa indicates the time t and the ordinate indicates the values from the counter or the presence or absence of each pulse. When the speed of rotation of the motor 10 is increased, the period of the FG pulse is decreased and increase in the counter value between adjacent pulses is reduced, whereby the speed error signal is reduced. Then the PG pulse is shifted leftwardly in FIG. 5 with respect to the V pulse, and hence the value at the latch circuit 16 is decreased whereby the phase error signal is reduced. When, to the contrary, the said speed of rotation is reduced, both of the speed error signal and the phase error signal are increased. In other words, the speed and phase error signals are changed in the same direction with respect to change in the speed of rotation of the motor 10, in order to effectuate the digital servo apparatus.

It is obvious from the above description and FIG. 5 that the period of the FG pulse must be smaller than that of the V pulse in the set speed state while the period of the PG pulse must be equal to that of the V pulse in the set phase state.

The digital servo apparatus as shown in FIG. 4 can be formed by a one-chip microcomputer with only one chip, since the speed and phase control operation can be performed by one counter. The latch circuits 16, 141 and 142 may be formed by internal registers or external storage elements of the microcomputer while the comparator 15 is implemented by an accumulator and various controllers such as the controller 24 can be formed by programs of the microcomputer.

Figure 6:
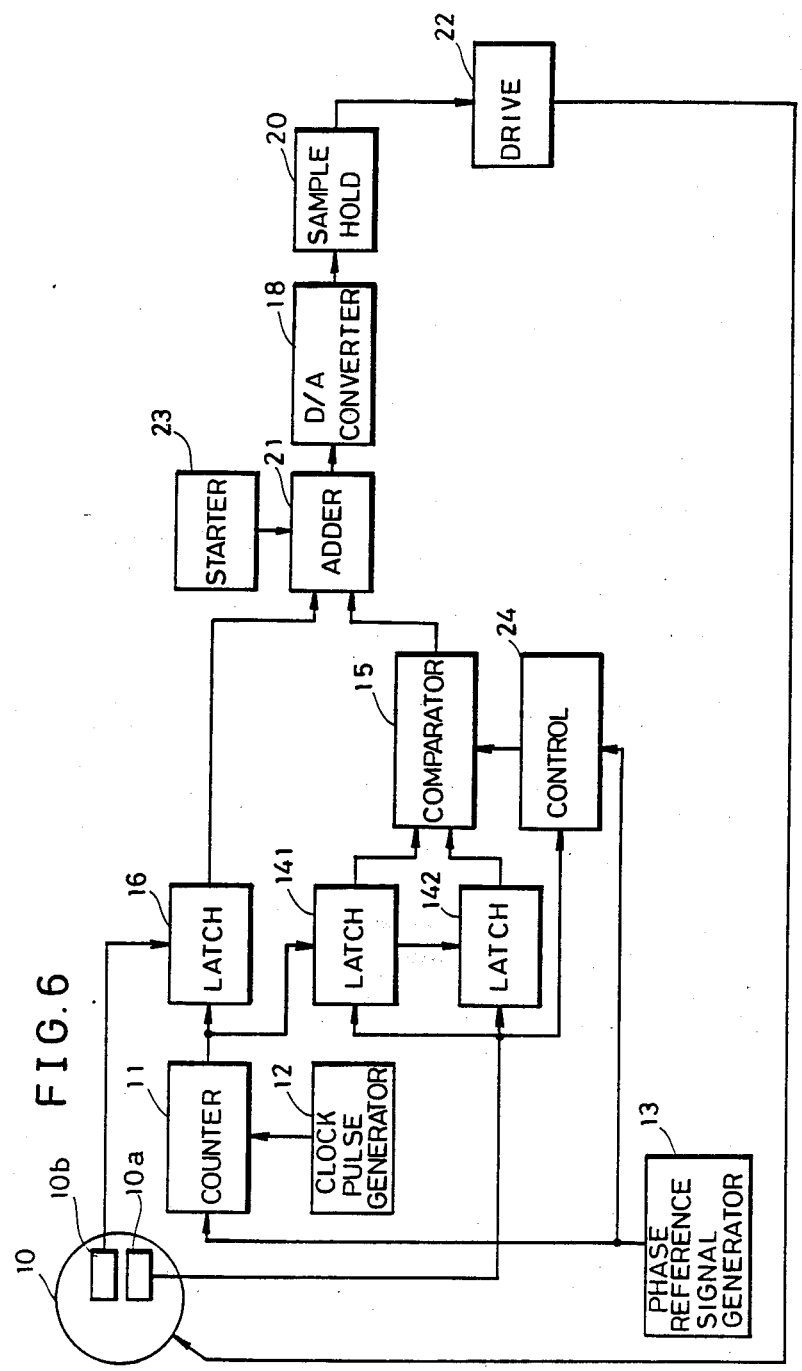
FIG. 6 is a schematic block diagram showing another embodiment of the present invention.

FIG. 6 is a schematic block diagram showing another embodiment of the present invention. The block diagram as shown in FIG. 6 is substantially identical to that shown in FIG. 4, except for the following points: A speed error signal generated from a comparator 15 is added up with a phase error signal generated from a latch circuit 16, to be converted by a D-A converter 18 into an analog signal, which is sampled and held by a sample-and-hold circuit 20 to be supplied to a driving circuit 22. Such structure also enables speed and phase control of a motor 10 by one counter 11 similarly to that shown in FIG. 4, in a more simplified manner.

Figure 7:
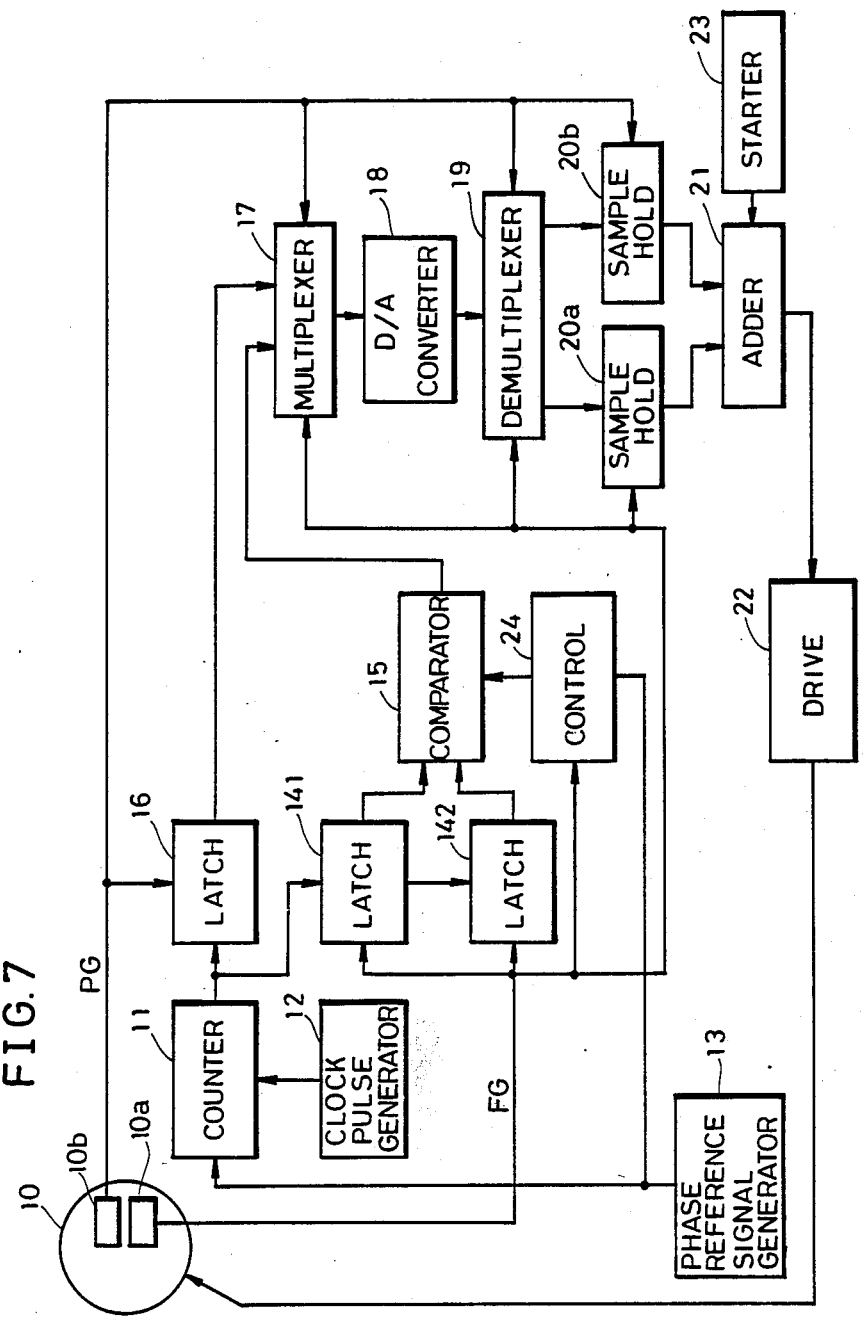
FIG. 7 is a schematic block diagram showing still another embodiment of the present invention.

FIG. 7 is a schematic block diagram showing still another embodiment of the present invention. The embodiment as shown in FIG. 7 is substantially identical to that in FIG. 4, except for the following points: In the embodiment as shown in FIG. 7, only one D-A converter 18 is provided for converting the speed error signal and the phase error signal into analog signals. The speed error signal generated from a comparator 15 and the phase error signal generated from a latch circuit 16 are selected by a multiplexer 17 in synchronization with an FG pulse and a PG pulse. The selected speed error signal and phase error signal are successively converted into analog signals by the D-A converter 18, to be separated from each other by a demultiplexer 19. Then the phase error signal is supplied to a sample-and-hold circuit 20a while the speed error signal is supplied to a sample-and-hold circuit 20b. Such structure reduces the number of the D-A converter 18.

The operation is performed on the basis of count outputs of the same counter 11 so that the digital outputs of the comparator 15 and the latch circuit 16 are equal in maximum value to each other and the maximum operation ranges of the D-A converter 18 are identical, and hence no problem is caused by common application of the D-A converter 18 to analog conversion of the speed and phase error signals.

Figure 8:
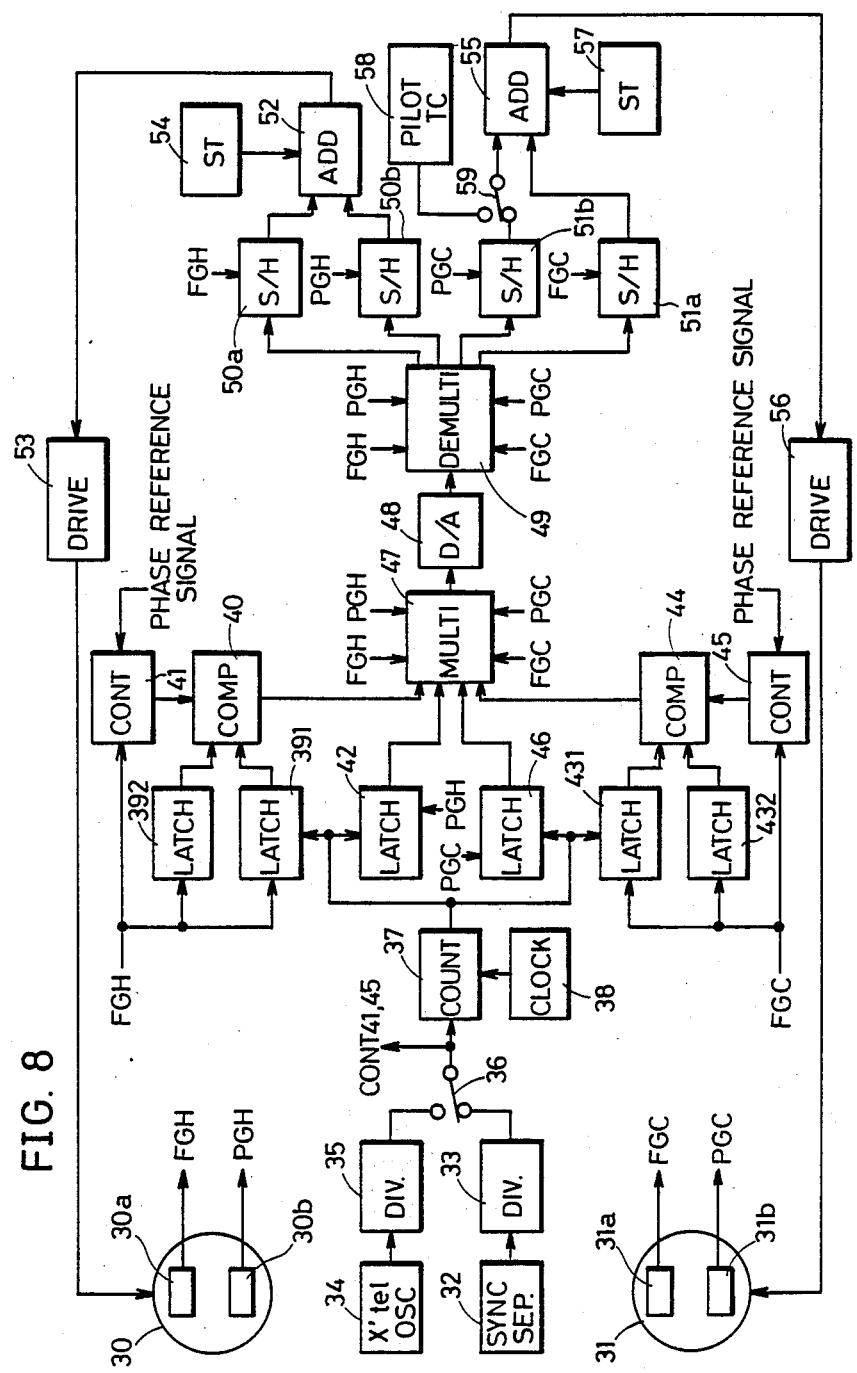
FIG. 8 is a schematic block diagram showing a further embodiment of the present invention.

FIG. 8 is a schematic block diagram showing a further embodiment of the present invention. The embodiment as shown in FIG. 8 is applied to a digital servo apparatus which controls the speeds and phases of two motors such as a cylinder motor and a capstan motor of an 8 mm video tape recorder. With reference to FIG. 8, structure of the digital servo apparatus is now described. A cylinder motor 30 comprises a speed detecting pulse generator 30a for generating an FGH pulse and a phase detecting pulse generator 30b for generating a PGH pulse.

In a similar manner, a capstan motor 31 comprises a speed detecting pulse generator 31a for generating an FGC pulse and a phase detecting pulse generator 31b for generating a PGC pulse. Although the PGH pulse is obtained by frequency-dividing the FGC pulse generated from the speed detecting pulse generator 31a in practice, it is assumed here that the phase detecting pulse generator 31b is provided for generating the PGC pulse, for convenience of illustration.

In recording operation of the 8 mm video tape recorder, a phase reference signal, which is a V pulse, is formed by a signal of 30 Hz obtained by frequency-dividing the output of a synchronizing separation circuit 32 for separating a vertical synchronizing signal from a composite video signal by a frequency divider 33. In reproducing operation, employed is a signal of 30 Hz obtained by frequency-dividing the output of a crystal oscillator 34 by a frequency divider 35. These V pulses are selected by a switch 36 in response to recording and reproducing modes, to be supplied to a counter 37. The counter 37 counts reference clock signals generated from a reference clock signal generator 38, and is reset in synchronization with the V pulse.

The counter 37 is commonly used for speed and phase control of the motors 30 and 31, in a similar manner to the embodiment as shown in FIG. 4. The speed error signal in digital value for the cylinder motor 30 is obtained by two latch circuits 391 and 392 for successively reading the count values of the counter 37 in synchronization with the FGH pulse, a comparator 40 for comparing the count values respectively latched by the latch circuits 391 and 392 with each other and a controller 41 which receives the FGH pulse and the V pulse for controlling the comparator 40 in consideration of reset of the counter 37 by the V pulse in a similar manner to the aforementioned embodiment. The phase error signal in digital value is obtained by a latch circuit 42 for reading the count value of the counter 37 in synchronization with the PGH pulse.

On the other hand, the speed error signal in digital value for the capstan motor 31 is obtained by two latch circuits 431 and 432 for successively reading the count values of the counter 37 in synchronization with the FGC pulse, a comparator 44 for comparing the values respectively latched by the latch circuits 431 and 432 and a controller 45 which receives the FGC pulse and the V pulse for controlling the comparator 44 in consideration of reset of the counter 37 by the V pulse in a similar manner to the aforementioned embodiment.

The phase error signal in digital value is obtained by a latch circuit 46 which reads the count value of the counter 37 in synchronization with the PGC pulse. The respective digital error signals are converted into analog signals through a multiplexer 47, a D-A converter 48 and a demultiplexer 49, to be held in sample-and-hold circuits 50a, 50b, 51a and 51b.

In further detail, the output of the comparator 40 is supplied to the D-A converter 48 through the multiplexer 47 to be converted into an analog signal, which is sampled and held as the speed error signal for the cylinder motor 30 by the sample-and-hold circuit 50a controlled by the FGH pulse. Similarly, the output of the latch circuit 42 is converted into an analog signal, which is sampled and held as the phase error signal for the cylinder motor 30 by the sample-and-hold circuit 50b controlled by the PGH pulse. Also in a similar manner, the output of the comparator 44 is converted into an analog signal, which is sampled and held as the speed error signal for the capstan motor 31 by the sample-and-hold circuit 51a controlled by the FGC pulse.

Further, the output of the latch circuit 46 is also converted into an analog signal, which is sampled and held as the phase error signal for the capstan motor 31 by the sample-and-hold circuit 51b controlled by the PGC pulse.

The multiplexer 47 and the demultiplexer 49 receive the FGH pulse, PGH pulse, FGC pulse and PGC pulse respectively as control signals, so that the respective digital error signals are commonly converted into analog signals by the D-A converter 48 in a time sharing manner. Such structure is effective for the same reason as that for the embodiment as shown in FIG. 7, and detailed description thereof is omitted.

The speed error signal and the phase error signal respectively sampled and held by the sample-and-hold circuits 50a and 50b are adapted to control the cylinder motor 30 through an adder 52 and a driving circuit 56. A starter 54 supplies the driving circuit 53 with a start signal through the adder 52 to start the cylinder motor 30.

On the other hand, both of the speed error signal and the phase error signal sampled and held by the sample-and-hold circuits 51a and 51b are adapted to control the capstan motor 31 through an adder 55 and a driving circuit 56. A starter 57 supplies the driving circuit 56 with a start signal through the adder 55 for starting the capstan motor 31.

The aforementioned description has been made on the recording operation of the 8 mm video tape recorder, and since the output of a pilot IC 58 is employed as the phase error signal for the capstan motor 31 in reproducing operation, a switch 59 must be operated to switch the output of the pilot IC 58 and that of the sample-and-hold circuit 51b. The pilot IC 58 is adapted to generate tracking control signals by four pilot signals recorded per video track of a magnetic tape. Such control by the pilot signals is described in detail in U.S. Pat. No. 4,297,733.

FIG. 9 is a timing chart for illustrating the operation of the digital servo apparatus as shown in FIG. 8. The timing chart as shown in FIG. 9 shows the outputs of the FGH pulse, PGH pulse, FGC pulse and PGC pulse in the case where the cylinder motor 30 and the capstan motor 31 are in set speed and phase states respectively, while the abscissa indicates the time and the ordinate indicates values of the outputs. The embodiment as shown in FIG. 8 is substantially identical in basic operation to that shown in FIG. 7 except for that the counter 37 is employed commonly for speed and phase control of the cylinder motor 30 and a capstan motor 31 and that the multiplexer 47 receives four inputs while the demultiplexer 49 generates four outputs, and detailed description thereof is omitted.

The speed control operation is performed through the amount of increase in the counter value of the counter 37 between two adjacent pulses of the FGH or FGC pulse. Thus, the period of each pulse in the set speed state can be set at desire on condition that the same is smaller than the period of the reference phase signal serving as the V pulse. However, the phase control operation is performed directly through the count value of the counter 37 at the rise of the PGH or PGC pulse, and hence the period of each pulse in the set phase state must be identical to that of the V pulse. In order to perform phase control operation on the two motors 30 and 31 which are different in speed from each other, therefore, the respective phase detecting pulse generators 30b and 31b must be provided with frequency dividers or the like so that the period of each output pulse is equal to that of the phase difference signal as shown in FIG. 8.

Although the embodiment as shown in FIG. 8 employs only one D-A converter 48 to switch the phase and speed error signals for the cylinder motor 30 and those for the capstan motor 31 through the multiplexer 47 and the demultiplexer 49, the structure is not restricted to this and the D-A converter may be provided for each error signal, similarly to the embodiment as shown in FIG. 4.

Further, the present invention is applicable to operation for controlling more than two motors. According to the present invention, speed and phase control of a plurality of motors can be performed commonly through one counter which is reset by the phase reference signal, by providing a speed detecting pulse generator, a phase detecting pulse generator, three latch circuits, a comparator, a controller and a driving circuit etc. for each motor, while increasing numbers of the channels of a multiplexer and a demultiplexer.

When a digital servo apparatus is formed by a microcomputer, the processing is performed through programs. Therefore, the FGH pulse, FGC pulse, PGH pulse and PGC pulse must not be identical in phase to each other. When a cylinder motor generates an FGH pulse and a capstan motor generates an FGC pulse simultaneously or in an extremely approximate manner, performed is processing on the pulse inputted in advance or higher in priority, and the other pulse is not processed until the said processing is completed. Thus, the other pulse is regarded as delayed in signal timing, whereby the generated error signal is in error.

Consideration is now made on such phase relation with reference to a video tape recorder in practice. In the recording operation, the cylinder motor 30 and the capstan motor 31 are synchronized in phase with respect to each other and hence the frequency of the FGC pulse may be appropriately selected to prevent the FGH and PGH pulses of the cylinder motor 30 and the FGC pulse of the capstan motor 31 from being simultaneously inputted in the microcomputer.

In the reproducing operation, however, tracking control by the pilot signal is so performed that the phase of the capstan motor 31 cannot be fixed with respect to the reference phase signal, and hence the FGH pulse and the PGH pulse of the cylinder motor 30 and the FGC pulse of the capstan motor 31 may possibly be inputted in the microcomputer simultaneously or in an extremely approximate manner. When the FGH pulse, PGH pulse and PGC pulse of the two motors 30 and 31 are simultaneously inputted in the microcomputer, the error signals outputted may include errors to cause erroneous control of rotation of the motors 30 and 31. Therefore, the FGH pulse for the cylinder motor 30 is processed in priority to processing of the FGC pulse for the capstan motor 31, so that no error is caused in the speed error signal based on the FGC pulse. Description is now made on such an embodiment.

Figure 10:
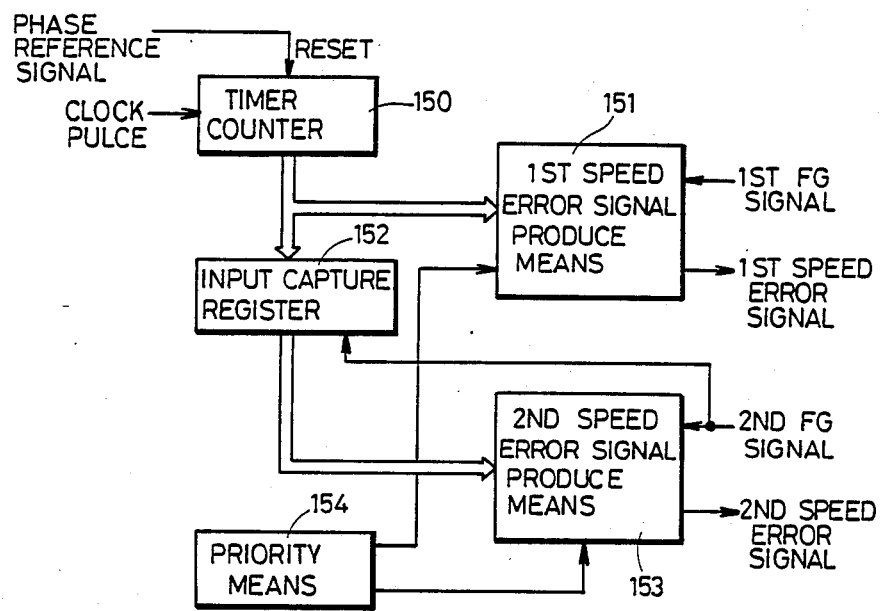
FIG. 10 is a schematic block diagram showing a still further embodiment of the present invention.

FIG. 10 is a schematic block diagram showing a still further embodiment of the present invention. This embodiment is shown in principle in FIG. 10, and is formed by a timer counter 150, a first speed error signal producing means 151, an input capture register 152, a second speed error signal producing means 153 and a priority means 154.

The timer counter 150 counts reference clock signals, and is reset or preset by phase reference signals. The first speed error signal producing means 151 receives a first FG signal from a first motor (not shown) to produce a first speed error signal on the basis of the count value of the timer counter 150 at the timing of the first FG signal. The input capture register 152 receives a second FG signal from a second motor (not shown) to store the count value of the timer counter 150 at the timing of the second FG signal, independently of the operation status of the CPU 115. The second speed error signal producing means 153 produces a second speed error signal on the basis of the count value stored in the input capture register 152.

The priority means 154 is adapted to make the first speed error signal producing means 151 perform processing in priority to the second speed error signal producing means 153, the processing of which is forced to wait. Such operation of the priority means 154 for making the first FG signal processed in priority to the second FG signal causes no error in the speed error signal based on the second FG signal, since the input capture register 152 stores the count value of the timer counter 150 with respect to the second FG signal.

Figure 11:
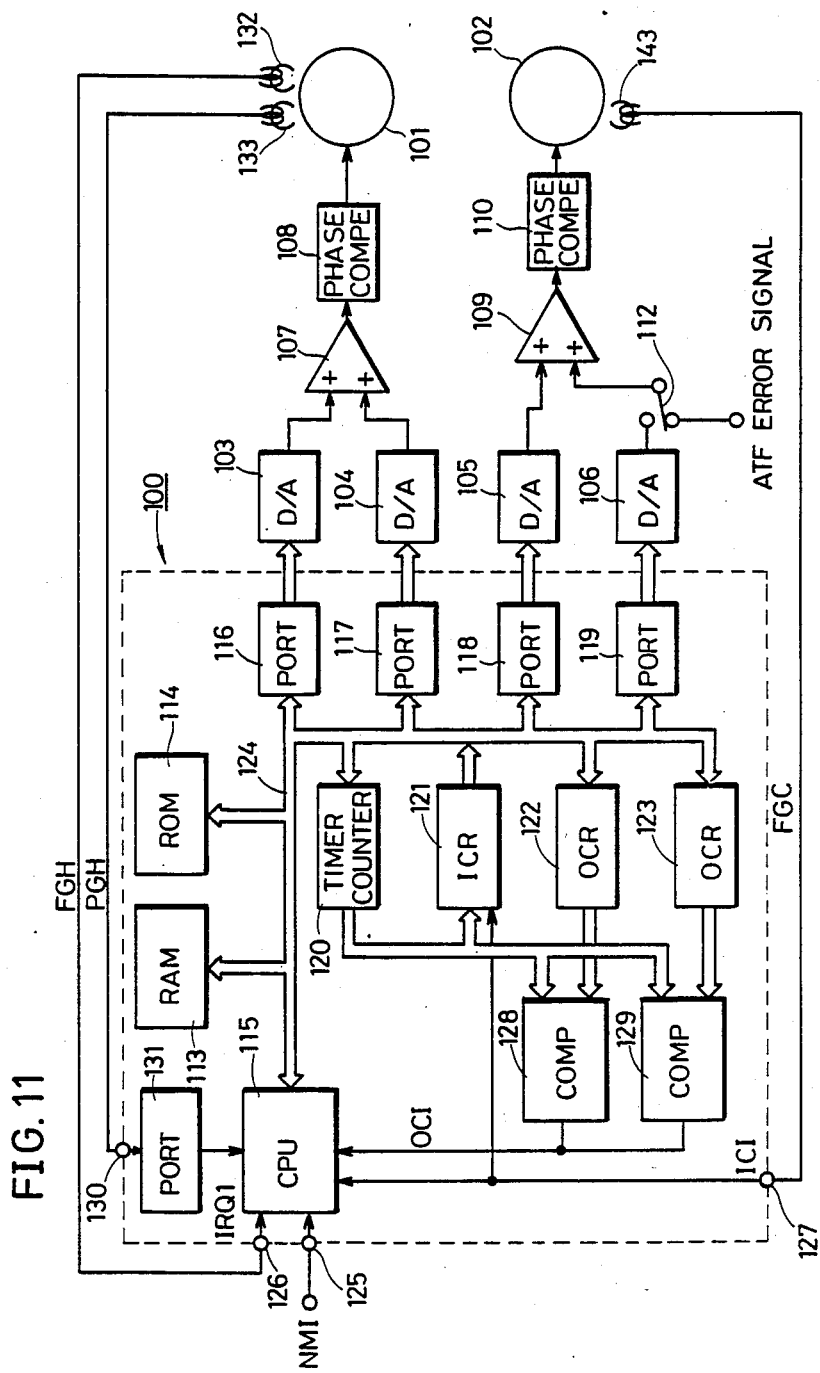
FIG. 11 is a definite block diagram of the embodiment as shown in FIG. 10.

FIG. 11 is a definite block diagram of the embodiment as shown in FIG. 10. Referring to FIG. 11, structure of the embodiment is now described. The embodiment as shown in FIG. 11 is adapted to perform phase and speed control of a cylinder motor 101 and a capstan motor 102 by program processing through a microcomputer 100. A speed deteecting pulse generator 132 and a phase detecting pulse generator 133 are provided in relation to the cylinder motor 101, while a speed detecting pulse generator 143 is provided in relation to the capstan motor 102. D-A converters 103 to 106 are adapted to convert outputs from the microcomputer 100 into analog signals. An adder 107 adds up respective analong outputs from the D-A converters 103 and 104. An adder 109 adds up respective analog outputs from the D-A converters 105 and 106. The output from the adder 107 is supplied to a phase compensation circuit 108, to control the phase and the speed of the cylinder motor 101. The output of the adder 109 is supplied to another phase compensation circuit 108, to control the phase of the capstan motor 102. An input end of the adder 109 is connected with a selection switch 112. The selection switch 112 is adapted to switch the output of the D-A converter 106 and an ATF (Automatic Tracking Finder) error signal received in an input terminal 11 in response to recording and reproducing modes.

The microcomputer 100 includes a RAM 113, a ROM 114, a CPU 115, output ports 116 to 119, a 16-bit timer counter 120, an input capture register (ICR) 121, output compare registers (OCR) 122 and 123, a data bus 124, comparators 128 and 129 and an output port 131 etc.

The microcomputer 100 is formed by, e.g., HD6301 by Hitachi, Ltd., and comprises seven internal interruptions. The phase reference signal is inputted in the CPU 115 through an NMI (non-maskable interruption) terminal 125 and the FGH pulse of the cylinder motor 101 is inputted in the CPU 115 through an IRQ$_1$ (interruption request 1) terminal 126 while the FGC pulse of the capstan motor 102 is inputted in the CPU 115 through an ICI (input capture interruption) terminal 127. The microcomputer 100 further includes OCI (output compare interruption) terminals for the outputs from the comparators 128 and 129.

As is well known in the art, interruption processing is performed in a hardware manner, and priority is established with respect to various interrupt operations. In the HD6301, the NMI operation is performed in top priority, followed by the IRQ$_1$, ICI and OCI operations in sequence. In case where an interruption is instructed during when the microcomputer 100 is already in other interrupt operation, the newly instructed interruption is executed after completion of the said interrupt operation.

When the level of the signal received in the ICI terminal 127 of the microcomputer 100 is changed (direction of the change can be set by a program), the input capture register 121 stores the count value of the timer counter 120 for counting the reference clock signals at that time. Simultaneously performed is the request for the ICI operation.

The request for the output compare interruption (OCI) is internally generated when the values of the output compare registers (OCR) 122 and 123 set by the program are matched with the count value of the timer counter 120.

FIGS. 12 to 16 are flow charts for illustrating the operation of the embodiment as shown in FIG. 11, and FIG. 17 is a timing chart for illustrating the operation of the embodiment as shown in FIG. 10.

Figure 12:
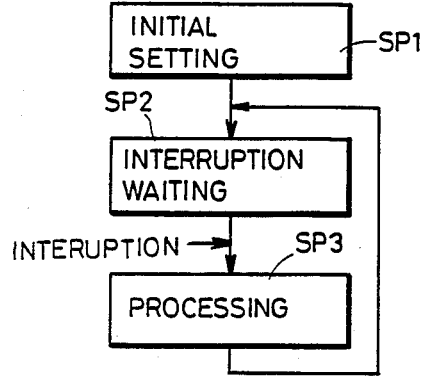

With reference to FIGS. 11 to 17, description is now made on definite operation of the digital servo apparatus. At a step SP1 as shown in FIG. 12, the microcomputer 100 is initially set and enters an interruption waiting state at a step SP2. Upon an interruption request, corresponding processing is performed at a step SP3, and upon completion of the said processing, the process is returned to the step SP1 and the microcomputer 100 enters the interruption waiting state.

Figure 13:
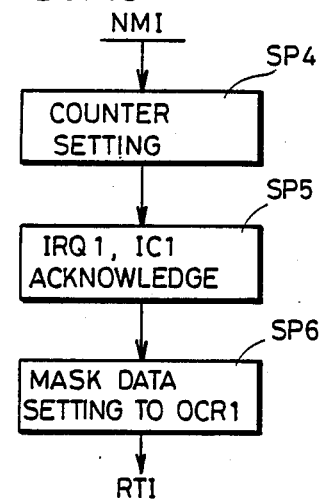

When the phase reference signal (FIG. 17(B)) received in the terminal 125 falls, the NMI operation as shown in FIG. 13 is requested. The timer counter 120 is set at a prescribed value (reset in this embodiment - see FIG. 17(A)) at a step SP4, so as to allow the IRQ$_1$ operation and the ICI operation at a step SP5 and set mask data in the output compare register 122 at a step SP6.

Figure 14:
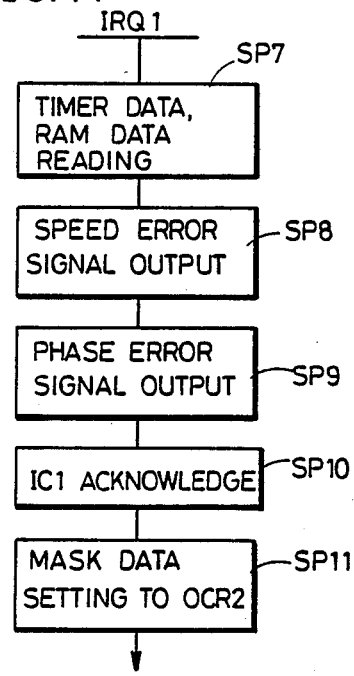

Upon input of the FGH pulse (see FIG. 17(C)) of the cylinder motor 101 in the IRQ$_1$ terminal 126, requested is the IRQ$_1$ operation as shown in FIG. 14. At a step SP7, read are the count output of the timer counter 120 and that upon output of an FGH pulse ahead thereof. The count value of the timer counter 120 upon the output of the FGH pulse ahead thereof is stored in the RAM 113. At a step SP8, obtained is difference between the current count value of the timer counter 120 and the count value upon the output of the FGH pulse ahead thereof, whereby the speed error signal is produced to be supplied to the port 116. Then the count value of the timer counter 120 at this time is stored in the RAM 113 for subsequent processing.

The phase error signal is produced by utilizing the prescribed relation between the FGC pulse and the PGC pulse.

The phase error signal is outputted at a step SP9. In other words, the PGC pulse from the cylinder motor 101 is supplied to the CPU 115 through the terminal 130 and the input port 131, and if the PGC pulse is being inputted in the input port 131 upon generation of the IRQ$_1$ request, the count value of the timer counter 120 at this time is outputted to the port 117 as the phase error signal.

The phase error signal may be inputted in the CPU 115 by employing the PGC pulse itself for interruption.

Upon output of the speed error signal and phase error signal in the aforementioned manner, the ICI operation is allowed at a step SP10, and subsequent mask data is set in the output compare register 123 at a step SP11 whereby the process is returned to the interruption waiting state.

Figure 15:
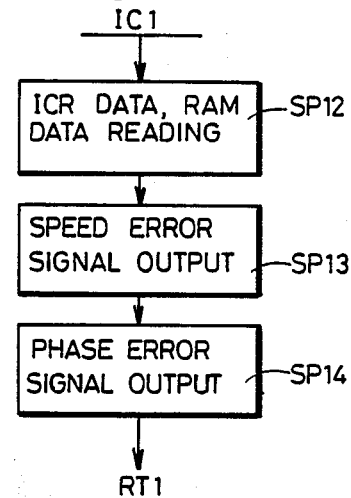

When the ICI terminal 127 receives the FGC pulse as shown in FIG. 17(H) from the speed detecting pulse generator 143 for the capstan motor 102, the process is advanced to the steps as shown in FIG. 15, so that the data of the timer counter 120 are stored in the input capture register 121 while the ICI operation is executed if no other interrupt operation is executed, at a step SP12. At a step SP13, the speed error signal is produced on the basis of the data of the input capture register 121 and the RAM 113, to be outputted to the port 118. Further, the data of the input capture register 121 are stored in the RAM 113 for subsequent processing. At a step SP14, the FGC pulse is frequency-divided by prescribed times to generate the PGC pulse. The phase error signal is produced on the basis of the count value of the timer counter 120 stored in the input capture register 121 when the prescribed order FGC pulse is inputted, to be supplied to the port 119.

If the microcomputer 100 is in other interrupt operation when the ICI terminal 127 receives the FGC pulse from the capstan motor 102, the interruption is forced to wait until the said operation is completed. However, since the count value of the timer counter 120 at the output timing of the FGC pulse is held in the input capture register 121, the speed error signal is correctly produced even if the ICI operation is executed after completion of the preceding interrupt operation.

The above description has been made on the case where the FGC pulse of the capstan motor 102 as shown in FIG. 17(H) is generated after the phase reference signal as shown in FIG. 17(B) and the FGH pulse of the cylinder motor 101 as shown in FIG. 17(C). However, if the FGC pulse of the capstan motor 102 is inputted in the microcomputer 100 at a timing slightly ahead of the phase reference signal and the FGC pulse of the cylinder motor 101, other interruption processing is forced to wait until the ICI processing is completed, leading to inconvenience in operation.

Therefore, the ICI operation is masked for a period preceding the phase reference signal and the FGH pulse by a time required for the ICI processing, e.g., 300 to 500 μsec. or a slightly longer period.

Figure 16:
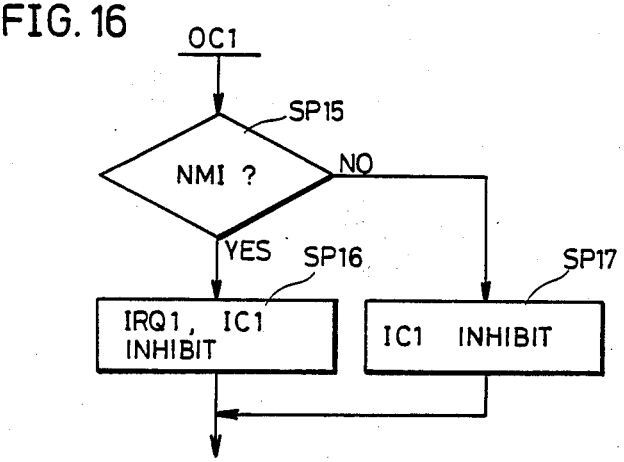
FIGS. 12 to 16 are flow charts for illustrating operation of embodiment as shown in FIG. 11.

This making operation is performed through the output compare registers 122 and 123 and the OCI operation. In other words, when a count value A is set in the output compare register 122 in the NMI processing as shown in FIG. 13, the data of the timer counter 120 is equal to the count value A whereby the OCI operation is reguested (see FIG. 17 (D)). Then as shown in FIG. 16, a determination is made as to whether or not the masking is is performed by the NMI at a step SP15, and if the determination is yes, the IRQ₁ and ICI operations are inhibited at a step SP16.

In the IRQ₁ processing, on the other hand, set in the output compare register 123 is prescribed data ahead of a subsequent IRQ₁ processing timing. Then the OCI operation is requested as shown in FIG. 17(F) every time the count value of the timer counter 120 is matched with the content of the output compare register 123, whereby the ICI operation is inhibited at a step SP17 as shown in FIG. 16.

The inhibited interruption processing is again allowed through the processes as shown in FIGS. 12 and 13 by completion of the NMI and IRQ₁ processing.

Thus, the IRQ₁ operation is masked for an H-level period as shown in FIG. 17(D) by the priority of interruption and masking processing through the output compare registers 122 and 123, while the ICI operation is masked for an H-level period as shown in FIGS. 17 (D) and (E). Whe the microcomputer employed has no OCI, it may be provided with other priority means.

The FGH pulse for the capstan motor 102 is supplied to the ICI terminal 127 for the reason that the rotational phase of the capstan motor 102 is changed due to tracking control while rotation of the cylinder motor 101 is controlled to be locked with respect to the phase reference signal.

Although the above description has been made processing of the FGH pulse, the present invention may be applied to process the PGH pulse. Further, the phase error signal and the speed error signal may be added up in the microcomputer 100 to be outputtted through a programmed digital filter.

Even if a rotation detecting signal for a motor such as the PGH pulse or the FGH pulse to be processed in priority is generated in an overlapped or approximate manner with other rotation detecting signal for another motor in case of controlling rotation of two or more motors, as hereinabove described, no error is caused in the error signals since the count value of the other motor is stored in the input capture register 121.

Although the present invention has been describes and illustrated in detail, it is clearly understood that the same is by way of illustration and example only and is not to be taken by way of limitaion, the spirit and scope of the present invention being limited only by the terms of the appended claims.

What is claimed is:

1. A digital servo apparatus for controlling the phase and speed of a rotating merber, comprising:
    phase reference signal generator means for generating a phase reference signal representing the reference phase of said rotating member;
    reference clock signal generator means for generating reference clock signals;
    counter means for counting said reference clock signals from said reference clock signal generator means, said counter means being reset by said phase reference signal from said phase reference signal generator means;
    speed signal generator means operatively connected to said rotating member for generating a signal representing the speed of said rotating member;
    phase signal generator means operatively connected to said rotating member for generating a signal representing the phase of said rotating member;
    read/compare means for reading the count output of said counter means in response to the speed signal supplied from said speed signal generator means to compare said count output with a count output read upon input of a speed signal immediately ahead of said speed signal;
    speed error signal generator means for generating a speed error signal for said rotating member on the basis of the compared output from said read/compare means;
    read means for reading the count output of said counter means in response to the phase signal supplied from said phase signal generator means;

phase error signal generator means for generating a phase error signal for said rotating member in response to the read output from said read means; and driving means for controlling the speed and phase of said rotating member on the basis of said speed error signal from said speed error signal generator means and said phase error signal from said phase error signal generator means.

2. A digital servo apparatus in accordance with claim 1, wherein said read/compare means includes:

first storage means for storing the count output of said counter means in response to supply of the speed signal from said speed signal generator means, second stroage means for storing the count output stored in said first storage means in response to supply of the speed signal from said speed signal generator means, and comparator means for comparing the counter output stored in said first storage means with that stored in said second storage means.

3. A digital servo apparatus in accordance with claim 1, wherein said speed error signal generator means includes:

first D-A converter means for converting the compared output from said read/compare means into an analog signal, and first sample-and-hold means for sampling and holding said analog signal converted by said first D-A converter as a speed error signal.

4. A digital servo apparatus in accordance with claim 1, wherein said phase error signal generator means includes:

second D-A converter means for converting the count output read by said read means into an analog signal, and second sample-and-hold means for sampling and holding said analog signal converted by said second D-A converter means as a phase error signal.

5. A digital servo apparatus in accordance with claim 1, wherein said speed error signal generator means and said phase error signal generator means include:

adder means for adding up the output of said read/compare means and the output of said read means, third D-A converter means for converting the output from said adder means into an analog signal, third sample-and-hold means for sampling and holding the output from said third D-A converter means.

6. A digital servo apparatus in accordance with claim 1, wherein said speed error signal generator means and said phase error signal generator means include:

a multiplexer for selecting the output of said read/compare means in response to supply of said speed signal and selecting the output of said read means in response to supply of said phase signal, fourth D-A converter means for converting the selected output from said multiplexer into an analog signal, a demultiplexer for extracting the output of said fourth D-A converter means in response to supply of said speed signal and extracting the output of said third D-A converter means in response to supply of said phase signal, and fourth and fifth sample-and-hold means for respectively sampling and holding the outputs from said demultiplexer.

7. A digital servo apparatus in accordance with claim 1, wherein said counter means, said read/compare means and said read means are formed by a microcomputer.

8. A digital servo apparatus in accordance with claim 3, wherein said first D-A converter means is contained in a microcomputer.

9. A digital servo apparatus in accordance with claim 4, wherein said second D-A converter means is contained in a microcomputer.

10. A digital servo apparatus in accordance with claim 1 wherein a plurality of said rotating members are provided, said speed signal generator means, said phase signal generator means, said read/compare means, said read means, said speed error signal generator means, said phase error signal generator means and said driving means are provided in correspondence to respective ones of said plurality of rotating members, one said phase reference signal generator means, one said reference clock signal generator means and one said counter means being provided to be commonly employed with respect to a plurality of respective said means.

11. A digital servo apparatus in accordance with claim 1, wherein said rotating member is provided in a video apparatus for recording or reproducing video composite signals, said phase reference signal generator means including means for generating phase reference signals in synchrinization with vertical synchronizing signals included in said video composite signals in recording operation and generating predetermined phase reference signals in reproducing operation.

12. A digital servo apparatus for controlling phases and speeds of at least two rotating members, said digital servo apparatus comprising:

phase reference signal generator means for generating phase reference signals representing the reference phases common to said at least two rotating members;

reference clock signal generator means for generating reference clock signals;

counter means for counting said reference clock signals generated from said reference clock signal generator means, said counter means being reset or preset by said phase reference signals;

first rotation signal detecting means for outputting a rotation detecting signal for one of said at least two rotating members;

second rotation signal detecting means for outputting a rotation detecting signal for the other one of said at least two rotating members;

first error signal producing means for producing a first error signal on the basis of the count output from said counter means at the output timing of the rotation detectingg signal from said first rotation signal detecting means;

storage means for storing the count output of said counter means at the output timing of the rotation detecting signal form said second rotation signal detecting means;

second error signal producing means for producing a second error signal on the basis of the counter output stored in said storage means in response to supply of the rotation detecting signal from said second rotation signal detecting means; and priority means for making said first error signal produced by said first error signal producing means in priority to production of said second error signal by said second error signal producing means thereby to make the operation by said second error signal producing means enter a waiting state.

13. A digital servo apparatus in accordance with claim 12, wherein said first error signal producing means includes means for producing the first error signal in response to output of said first rotation detecting signal on the basis of difference between the count output of said counter means and a count output thereof upon input of a first rotation detecting signal immediately ahead of said first rotation detecting signal.

14. A digital servo apparatus in accordance with claim 12, wherein said first rotation signal detecting means includes first speed signal generator means for generating a signal representing the speed of said one of said rotating members, and said first error signal producing means includes first speed error signal generator means for generating a speed error signal for said one of said rotating members in response to supply of the first speed signal from said first speed signal generator means on the basis of the count output of said counter means and a count output of said counter means upon supply of a first speed signal immediately ahead of said first speed signal.

15. A digital servo apparatus in accordance with claim 14, wherein said first rotation signal generator means includes first phase signal generator means for generating a signal representing the phase of said one of said rotating members, and said first error signal producing means includes first phase error signal generator means for generating a phase error signal when the speed signal generated from said first speed signal generator means is in prescribed relation to the phase signal generated from said first phase signal generator means.

16. A digital servo apparatus in accordance with claim 12, wherein said second rotation signal detecting means includes second speed signal generator means for generating a signal representing the speed of said other rotating member, said storage means includes means for storing the count output of said counter means upon every generation of the speed signal by said second speed signal generator means, and said second error signal producing means includes second speed error signal generator means for generating a speed error signal for said other rotating member in response to output of the speed signal from said second speed signal generator means on the basis of the count output of said counter means and a count output upon output of a speed signal immediately ahead of said speed signal stored in said storage means.

17. A digital servo apparatus in accordance with claim 16, wherein said second rotation signal detecting means includes second phase signal detecting means for frequency-dividing the speed signal generated from said second speed signal generator means to output a signal representing the phase of said other rotating member, and said second error signal producing means includes second phase error signal generator means for generating a phase error signal for sid other rotating member in response to output of the phase signal by said second phase signal detecting means on the basis of the count output of said counter means stored in said storage means.

18. A digital servo apparatus in accordance with claim 16, wherein said priority means includes means for inhibiting generation of the speed error signal for said other rotating member by said second speed error signal generator means when said first speed error signal generator means generates the speed error signal for said one of said rotating members.

19. A digital servo apparatus in accordance with claim 17, wherein said priority means includes means for inhibiting generation of the phase error signal for said other rotating member by said second phase error signal generator means when said first speed error signal generator means generates the speed error signal for said one of said rotating members.

* * * * *